United States Patent
Xu et al.

(10) Patent No.: US 9,710,695 B2
(45) Date of Patent: Jul. 18, 2017

(54) CHARACTERIZING PATHOLOGY IMAGES WITH STATISTICAL ANALYSIS OF LOCAL NEURAL NETWORK RESPONSES

(71) Applicant: SONY CORPORATION, Tokyo (JP)

(72) Inventors: Xun Xu, Palo Alto, CA (US); Akira Nakamura, San Jose, CA (US); Su Wang, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/212,597

(22) Filed: Mar. 14, 2014

(65) Prior Publication Data

US 2014/0270431 A1 Sep. 18, 2014

Related U.S. Application Data

(60) Provisional application No. 61/794,238, filed on Mar. 15, 2013.

(51) Int. Cl.
*G06K 9/00* (2006.01)
*G06K 9/62* (2006.01)

(52) U.S. Cl.
CPC ....... *G06K 9/00147* (2013.01); *G06K 9/6273* (2013.01)

(58) Field of Classification Search
CPC G06N 7/005; G06N 3/08; G06N 3/02; G06N 3/084; G06N 3/082; G06N 3/0481;
(Continued)

(56) References Cited

U.S. PATENT DOCUMENTS 5,151,951 A * 9/1992 Ueda .................... G06K 9/4642
382/156
6,438,268 B1 8/2002 Cockshott et al.
(Continued)

FOREIGN PATENT DOCUMENTS

EP 0653726 A1 * 5/1995 ............. G06T 5/009
WO 2011162213 A1 12/2011

OTHER PUBLICATIONS

Gletsos, Miltiades, Stavroula G. Mougiakakou, George K. Matsopoulos, Konstantina S. Nikita, Alexandra S. Nikita, and Dimitrios Kelekis. "A computer-aided diagnostic system to characterize CT focal liver lesions: design and optimization of a neural network classifier." Information Technology in Biomedicine, IEEE Transactions on 7, No. 3 (2003): 153-.*
(Continued)

*Primary Examiner* — Sumati Lefkowitz
*Assistant Examiner* — Carol Wang
(74) *Attorney, Agent, or Firm* — Haverstock & Owens LLP

(57) ABSTRACT

For digital pathology imaging, intelligent processing, such as automatic recognition or content-based retrieval, is one significant benefit that drives the wide application of this technology. Before any intelligent processing on pathology images, every image is converted into a feature vector which quantitatively capture its visual characteristics. An algorithm characterizing pathology images with statistical analysis of local responses of neural networks is described herein. The algorithm framework enables extracting sophisticated textural features that are well adapted to the image data of interest.

31 Claims, 2 Drawing Sheets

(58) Field of Classification Search
CPC .... G06N 3/088; G06K 9/6267; A61B 5/7267; A61B 5/7264; G06T 7/0012; G06T 2207/30024; G06T 2207/10056; G06T 2207/20084; G06T 9/002
See application file for complete search history.

(56) References Cited

U.S. PATENT DOCUMENTS

| | | | |
|---|---|---|---|
| 6,754,380 B1* | 6/2004 | Suzuki et al. | 382/156 |
| 2001/0032198 A1 | 10/2001 | Pao et al. | |
| 2002/0068853 A1* | 6/2002 | Adler | 600/160 |
| 2004/0066966 A1* | 4/2004 | Schneiderman | 382/159 |
| 2005/0197982 A1* | 9/2005 | Saidi et al. | 706/21 |
| 2006/0036372 A1* | 2/2006 | Yener et al. | 702/19 |
| 2008/0292194 A1* | 11/2008 | Schmidt et al. | 382/217 |
| 2009/0208118 A1* | 8/2009 | Csurka | G06K 9/00664 382/228 |
| 2010/0004915 A1* | 1/2010 | Miller et al. | 703/11 |
| 2010/0075373 A1* | 3/2010 | Hoyt | 435/40.5 |
| 2011/0119215 A1* | 5/2011 | Elmegreen et al. | 706/37 |
| 2011/0276526 A1* | 11/2011 | Turbin | G01T 1/2957 706/17 |
| 2012/0099771 A1 | 4/2012 | Lao | |
| 2012/0189176 A1 | 7/2012 | Giger et al. | |
| 2012/0269384 A1* | 10/2012 | Jones et al. | 382/103 |
| 2013/0109051 A1* | 5/2013 | Li et al. | 435/34 |

OTHER PUBLICATIONS

Sharma, Neeraj, Amit K. Ray, Shiru Sharma, K. K. Shukla, Satyajit Pradhan, and Lalit M. Aggarwal. "Segmentation and classification of medical images using texture-primitive features: application of BAM-type artificial neural network." Journal of Medical Physics 33, No. 3 (2008): 119.*

Ranzato, Marc'Aurelio, and Martin Szummer. "Semi-supervised learning of compact document representations with deep networks." In Proceedings of the 25th international conference on Machine learning, pp. 792-799. ACM, 2008.*

Andrew Ng, Jiquan Ngiam, Chuan Yu Foo, Yifan Mai, Caroline Suen, Stacked Autoencoders—ufldl, <http://ufldl.stanford.edu/wiki/index.php/Stacked_Autoencoders>.*

Li, Jianguo, Weixin Wu, Tao Wang, and Yimin Zhang. "One step beyond histograms: Image representation using Markov stationary features." In Computer Vision and Pattern Recognition, 2008. CVPR 2008. IEEE Conference on, pp. 1-8. IEEE, 2008.*

Netzer, Yuval, Tao Wang, Adam Coates, Alessandro Bissacco, Bo Wu, and Andrew Y. Ng. "Reading digits in natural images with unsupervised feature learning." (2011).*

Adali et al.. Applications of Neural Networks to Biomedical Image Processing. Handbook of Neural Network Signal Processing, pp. 1-28. CRC Press LLC. 2002. Retrieved on [Jul. 16, 2014]. <URL: http://f3.tiera.ru/Shiz/math/Neural%20Networks/Hu%20Hwang/Handbook%20of%20Neural%20Network%20Signal%20Processing/2359_PDF_12.pdf>. entire document.

* cited by examiner

CHARACTERIZING PATHOLOGY IMAGES WITH STATISTICAL ANALYSIS OF LOCAL NEURAL NETWORK RESPONSES

CROSS-REFERENCE TO RELATED APPLICATION

This application claims the benefit of U.S. Provisional Patent Application Ser. No. 61/794,238, filed on Mar. 15, 2013, and titled "CHARACTERIZING PATHOLOGY IMAGES WITH STATISTICAL ANALYSIS OF LOCAL NEURAL NETWORK RESPONSES" which is hereby incorporated by reference in its entirety for all purposes.

FIELD OF THE INVENTION

The present invention relates to the field of digital pathology imaging. More specifically, the present invention relates to extracting features for quantitatively characterizing digital pathology images.

BACKGROUND OF THE INVENTION

Digital Pathology is an image-based information environment enabled by computer technology that allows for the management of information generated from a digital slide. Digital pathology is enabled in part by virtual microscopy, which is the practice of converting glass slides into digital slides that can be viewed, managed and analyzed.

SUMMARY OF THE INVENTION

For digital pathology imaging, intelligent processing, such as automatic recognition or content-based retrieval, is one significant benefit that drives the wide application of this technology. Before any intelligent processing on pathology images, every image is converted into a feature vector which quantitatively capture its visual characteristics. An algorithm characterizing pathology images with statistical analysis of local responses of neural networks is described herein. The algorithm framework enables extracting sophisticated textural features that are well adapted to the image data of interest.

In one aspect, a method of converting a pathology image into a feature vector programmed in a memory of a device comprises generating a neural network, teaching the neural network using a database of training patches cropped from a collection of pathology images, mapping training patches of the training data to response vectors, learning a mixture model from the response vectors and applying the learned model to a pathology image to convert the pathology image into a feature vector. An input to the neural network comprises a patch of the image. A plurality of local patches of the image are input to the neural network. The neural network is used to extract a low dimensional representation of a set of data. The neural network comprises a symmetric architecture, wherein input and output have a same number of dimensions. The teaching is unsupervised. The unsupervised teaching comprises using image samples that do not have manual labels assigned by a human. Image patches with a matching size to input of the neural network are cropped from training images. Teaching the neural network utilizes a back-propagation algorithm or a proper learning algorithm for the specific type of network. The neural network comprises a two-layer network with linear or non-linear activation functions. Learning the mixture model comprises K-means or EM algorithm. The method further comprises applying the learned model to a pathology image. Applying the learned model to the pathology image includes: computing pathology image response vectors at every pixel location of the pathology image by densely scanning the pathology image and applying the trained neural network to the local image patch at each pixel location. Quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

In another aspect, a method of analyzing an image programmed in a memory of a device comprises generating a neural network, teaching the neural network using unlabeled samples in a database of training patches cropped from a collection of pathology images, mapping training patches of the training data to response vectors, learning a mixture model from the response vectors and applying the learned model to a pathology image to convert the pathology image into a feature vector. An input to the neural network comprises a patch of the image. A plurality of local patches of the image are input to the neural network. The neural network is used to extract a low dimensional representation of a set of data. The neural network comprises a symmetric architecture, wherein input and output have a same number of dimensions. Image patches with a matching size to input of the neural network are cropped from the training images. Teaching the neural network utilizes a back-propagation algorithm or a proper learning algorithm for the specific type of network. The neural network comprises a two-layer network with linear or non-linear activation functions. Learning the mixture model comprises K-means or EM algorithm. Applying the learned model to the pathology image includes: computing pathology image response vectors at every pixel location of the pathology image by densely scanning the pathology image and applying the trained neural network to the local image patch at each pixel location. Quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

In another aspect, an apparatus comprises a non-transitory memory for storing an application, the application for: generating a neural network comprising a symmetric architecture, wherein input and output of the neural network have a same number of dimensions, teaching the neural network using image samples that do not have any manual labels assigned by a human in a database of training patches cropped from a collection of pathology images, mapping training patches of the training data to response vectors, learning a mixture model from the response vectors and applying the learned model to a pathology image to convert the pathology image into a feature vector and a processing component coupled to the memory, the processing component configured for processing the application. The neural network is used to extract a low dimensional representation of a set of data. Image patches with a matching size to input of the neural network are cropped from the training images. Teaching the neural network utilizes a back-propagation algorithm or a proper learning algorithm for the specific type of network. The neural network comprises a two-layer network with linear or non-linear activation functions. Learning the mixture model comprises K-means or EM algorithm. Applying the learned model to the pathology image includes: computing pathology image response vectors at every pixel location of the pathology image by densely scanning the pathology image and applying the trained neural network to the local image patch at each pixel location. Quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

DETAILED DESCRIPTION OF THE PREFERRED EMBODIMENT

Figure 1:
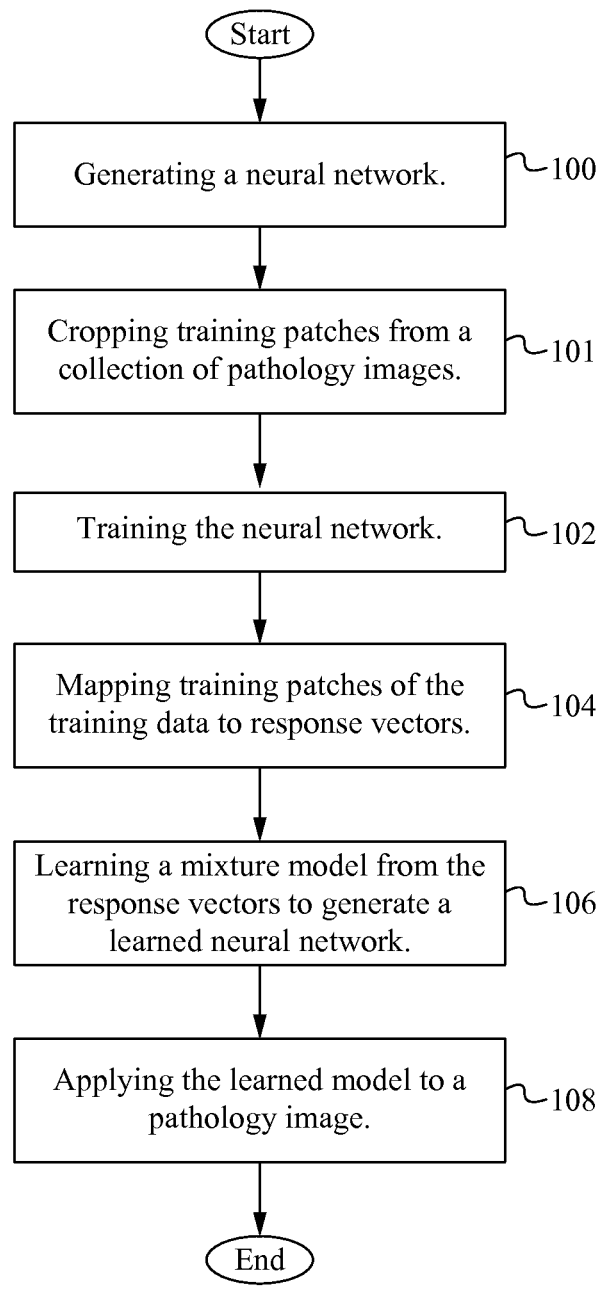
FIG. 1 illustrates a flowchart of a method of characterizing pathology images with statistical analysis of local neural network responses according to some embodiments.

For digital pathology imaging, intelligent processing, such as automatic recognition or content-based retrieval, is one significant benefit that drives the wide application of this technology. Before any intelligent processing on pathology images, every image is converted into a feature vector which quantitatively capture its visual characteristics. An algorithm characterizing pathology images with statistical analysis of local responses of neural networks is described herein. The algorithm framework enables extracting sophisticated textural features that are well adapted to the image data of interest.

Pathology images contain repetitively appearing, but spatially variant, textural patterns. Textural information is important for describing visual contents in pathology images. In the algorithm framework described herein, textural information in pathology images is extracted via statistical analysis of local responses of neural networks. This framework enables extracting sophisticated textural features that are well adapted to the image data of interest.

Image Analysis with Neural Networks
Neural Network for Images

To analyze pathology images, a neural network is constructed whose input is a patch in the image being analyzed. The neural network is able to be an auto-coder or any other alternative network such as Principal Component Analysis (PCA) or Independent Component Analysis (ICA). By scanning through the whole image, the same network is fed with local patches in the image and produces dense local response vectors. The procedure is able to be considered as generalized filtering. In contrast to a conventional linear filter, the neural network acts as a group of highly non-linear filters that transforms every local image region into a response vector.

Auto-Encoder and its Training

An auto-encoder is a specific neural network used to learn a low dimensional representation of a set of data. It has a symmetric architecture such that the input and output have the same number of dimensions. The parameters of the auto-encoder are learned from a set of training data so that its output is able to approximate (e.g. reconstruct) the input as accurately as possible. The learning is unsupervised as no manual labels for the samples are required.

To train the auto-encoder for analyzing pathology images, image patches that have a matching size to the network's input are cropped from training images. The auto-encoder network is then learned via a back-propagation algorithm or another algorithm.

After the auto-encoder is learned, its second half (the reconstructive part) is dropped, and the first half (the analytic part) is used for image analysis.

Alternative Choices of Networks

The framework described herein is flexible such that different networks besides the auto-encoder are able to be chosen. For example, by employing a two layer network with linear activation functions, Principal Component Analysis (PCA) or Independent Component Analysis (ICA) is able to be used as specific cases under this framework.

Statistical Analysis of Local Neural Networks Responses
Computing and Quantizing Local Responses After learning the network, e.g. auto-encoder or any other network mentioned above, all training patches are able to be mapped to response vectors. From these vectors, a mixture model is able to be learned via the K-means or Expectation Maximization (EM) algorithm.

As described herein, the learned network is able to be applied to new pathology images to be analyzed. The response vectors are computed at every pixel location by densely scanning the input image, then quantized against the learned model.

Image Feature from Statistics of Local Responses

Through the quantization procedure, the pathology image is mapped to a quantization map array where every element stores the cluster index assigned to each pixel location. From this map, feature vectors are able to be computed through statistical analysis—the simplest is histogram, or more sophisticated ones such as a co-occurrence matrix from which feature vectors such as Markov Stationary Feature are able to be derived. These feature vectors are concatenated to constitute the final quantitative description of the image to be analyzed.

FIG. 1 illustrates a flowchart of a method of characterizing images according to some embodiments. In the step 100, a neural network is generated. The neural network is able to be an auto-encoder or any other network mentioned above. The neural network comprises a symmetric architecture such that the input and output have a same number of dimensions. In the step 101, training image patches are collected by cropping pathology images into a certain size (e.g., 64-by-64) at random locations. In the step 102, the neural network is learned using a training data set. The neural network is used to extract a low dimensional representation of a set of data. The learning is unsupervised (e.g., requiring no labels). An auto-encoder is able to be learned through a back-propagation algorithm, while a PCA or ICA network is able to be learned by their classic learning algorithm, respectively. After learning, the reconstructive part of the network is dropped, and the analysis part will be used as the feature extractor that maps an image patch to a response vector. In the step 104, training patches of the training data are mapped to response vectors. In the step 106, a mixture model is learned from the response vectors to generate a learned neural network. Learning the mixture model is able to be implemented in any manner such as K-means or EM algorithm. In the step 108, the learned model is applied to a pathology image. Applying the learned model to the pathology image includes: computing pathology image response vectors at every pixel location of the pathology image by densely scanning the pathology image and quantizing the pathology image response vectors against the learned model.

Quantizing includes mapping the pathology image to a quantization map array where every element stores a cluster index assigned to each pixel location, from the quantization map, computing feature vectors through statistical analysis and concatenating the feature vectors to constitute a final quantitative description of the pathology image. In some embodiments, fewer or additional steps are implemented. In some embodiments, the order of the steps is modified. For example, in some embodiments, the neural network is already generated and trained, and the mixture model is already learned, and the process begins at the step 108. In another example, the process only includes generating and training, and the process ends at the step 108.

Figure 2:
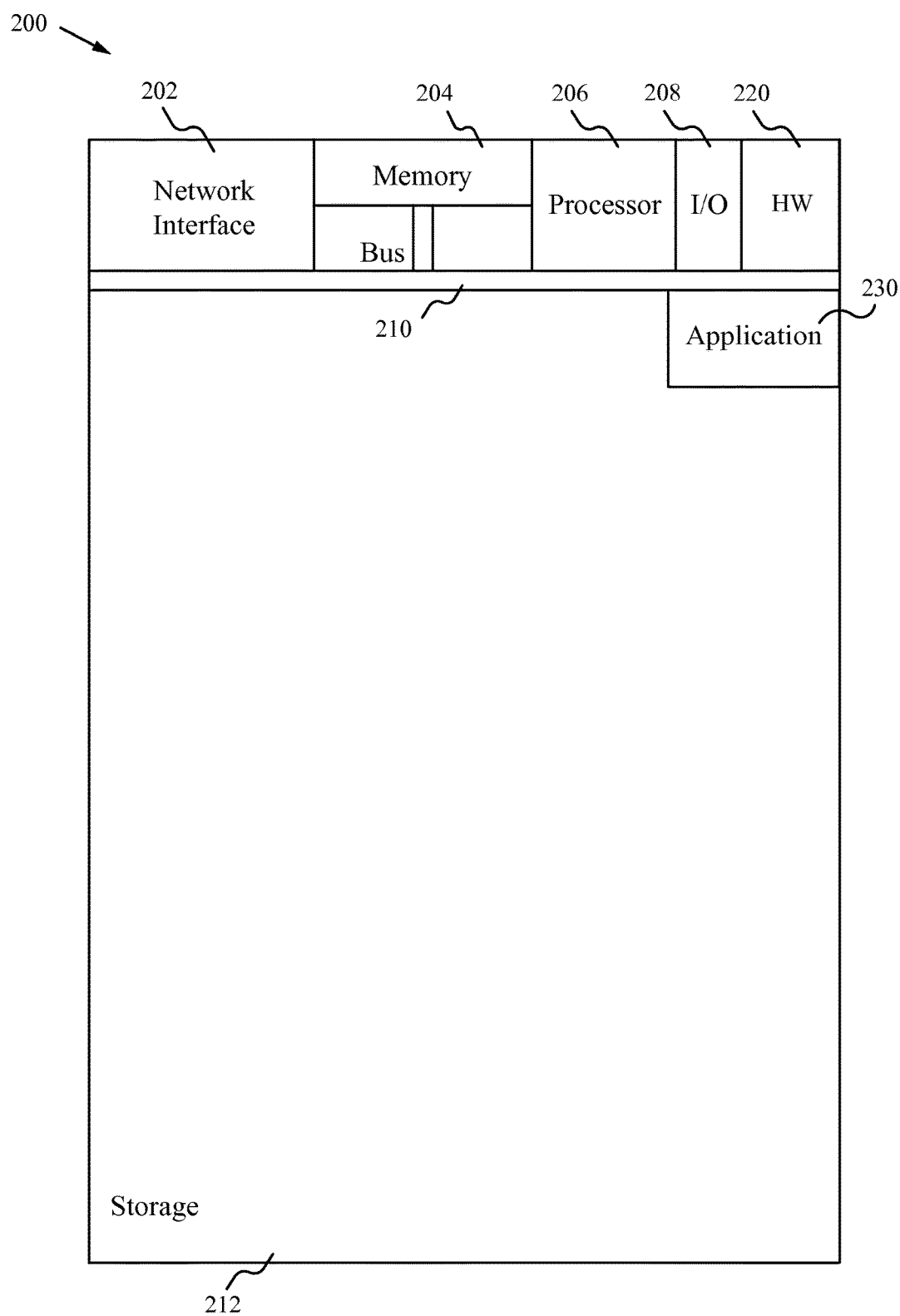
FIG. 2 illustrates a block diagram of an exemplary computing device configured to implement the pathology image characterization method according to some embodiments.

FIG. 2 illustrates a block diagram of an exemplary computing device configured to implement the pathology image characterization method according to some embodiments. The computing device 200 is able to be used to acquire, store, compute, process, communicate and/or display information such as text, images and videos. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blu-ray®, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, screen, printer, modem, touchscreen, button interface and other devices. Pathology image characterization application(s) 230 used to perform the pathology image characterization method are likely to be stored in the storage device 212 and memory 204 and processed as applications are typically processed. More or less components shown in FIG. 2 are able to be included in the computing device 200. In some embodiments, pathology image characterization hardware 220 is included. Although the computing device 200 in FIG. 2 includes applications 230 and hardware 220 for the pathology image characterization method, the pathology image characterization method is able to be implemented on a computing device in hardware, firmware, software or any combination thereof. For example, in some embodiments, the pathology image characterization applications 230 are programmed in a memory and executed using a processor. In another example, in some embodiments, the pathology image characterization hardware 220 is programmed hardware logic including gates specifically designed to implement the pathology image characterization method.

In some embodiments, the pathology image characterization application(s) 230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-ray® writer/player), a television, a home entertainment system or any other suitable computing device.

To utilize the pathology image characterization method, a device or several devices are used to generate a neural network, train the neural network and then use the neural network to characterize images. Each step is able to be performed automatically, manually or a combination thereof. Using the results of the pathology image characterization method, items are able to be identified such as items for diagnosis. For example, identifying a tumor.

In operation, the highly non-linear transform replaces simple linear filters to obtain more sophisticated features, and the transform learned from the training data replaces pre-defined filters to better adapt to the specific task in interest.

Some Embodiments of Characterizing Pathology Images with Statistical Analysis of Local Neural Network Responses 1. A method of converting a pathology image into a feature vector programmed in a memory of a device comprising:
   a. generating a neural network;
   b. teaching the neural network using a database of training patches cropped from a collection of pathology images;
   c. mapping training patches of the training data to response vectors;
   d. learning a mixture model from the response vectors; and
   e. applying the learned model to a pathology image to convert the pathology image into a feature vector.
2. The method of clause 1 wherein an input to the neural network comprises a patch of the image.
3. The method of clause 1 wherein a plurality of local patches of the image are input to the neural network.
4. The method of clause 1 wherein the neural network is used to extract a low dimensional representation of a set of data.
5. The method of clause 1 wherein the neural network comprises a symmetric architecture, wherein input and output have a same number of dimensions.
6. The method of clause 1 wherein the teaching is unsupervised.
7. The method of clause 6 wherein the unsupervised teaching comprises using image samples that do not have manual labels assigned by a human.
8. The method of clause 1 wherein image patches with a matching size to input of the neural network are cropped from training images.
9. The method of clause 1 wherein teaching the neural network utilizes a back-propagation algorithm or a proper learning algorithm for the specific type of network.
10. The method of clause 1 wherein the neural network comprises a two-layer network with linear or non-linear activation functions.
11. The method of clause 1 wherein learning the mixture model comprises K-means or EM algorithm.
12. The method of clause 1 further comprising applying the learned model to a pathology image.
13. The method of clause 12 wherein applying the learned model to the pathology image includes: computing pathology image response vectors at every pixel location of the pathology image by densely scanning the pathology image and applying the trained neural network to the local image patch at each pixel location.
14. The method of clause 13 wherein quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

15. A method of analyzing an image programmed in a memory of a device comprising:
   a. generating a neural network;
   b. teaching the neural network using unlabeled samples in a database of training patches cropped from a collection of pathology images;
   c. mapping training patches of the training data to response vectors;
   d. learning a mixture model from the response vectors; and
   e. applying the learned model to a pathology image to convert the pathology image into a feature vector.

16. The method of clause 15 wherein an input to the neural network comprises a patch of the image.

17. The method of clause 15 wherein a plurality of local patches of the image are input to the neural network.

18. The method of clause 15 wherein the neural network is used to extract a low dimensional representation of a set of data.

19. The method of clause 15 wherein the neural network comprises a symmetric architecture, wherein input and output have a same number of dimensions.

20. The method of clause 15 wherein image patches with a matching size to input of the neural network are cropped from the training images.

21. The method of clause 15 wherein teaching the neural network utilizes a back-propagation algorithm or a proper learning algorithm for the specific type of network.

22. The method of clause 15 wherein the neural network comprises a two-layer network with linear or non-linear activation functions.

23. The method of clause 15 wherein learning the mixture model comprises K-means or EM algorithm.

24. The method of clause 15 wherein applying the learned model to the pathology image includes: computing pathology image response vectors at every pixel location of the pathology image by densely scanning the pathology image and applying the trained neural network to the local image patch at each pixel location.

25. The method of clause 24 wherein quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

26. An apparatus comprising:
   a. a non-transitory memory for storing an application, the application for:
      i. generating a neural network comprising a symmetric architecture, wherein input and output of the neural network have a same number of dimensions;
      ii. teaching the neural network using image samples that do not have any manual labels assigned by a human in a database of training patches cropped from a collection of pathology images;
      iii. mapping training patches of the training data to response vectors;
      iv. learning a mixture model from the response vectors; and
      v. applying the learned model to a pathology image to convert the pathology image into a feature vector; and
   b. a processing component coupled to the memory, the processing component configured for processing the application.

27. The apparatus of clause 26 wherein the neural network is used to extract a low dimensional representation of a set of data.

28. The apparatus of clause 26 wherein image patches with a matching size to input of the neural network are cropped from the training images.

29. The apparatus of clause 26 wherein teaching the neural network utilizes a back-propagation algorithm or a proper learning algorithm for the specific type of network.

30. The apparatus of clause 26 wherein the neural network comprises a two-layer network with linear or non-linear activation functions.

31. The apparatus of clause 26 wherein learning the mixture model comprises K-means or EM algorithm.

32. The apparatus of clause 31 wherein applying the learned model to the pathology image includes: computing pathology image response vectors at every pixel location of the pathology image by densely scanning the pathology image and applying the trained neural network to the local image patch at each pixel location.

33. The apparatus of clause 32 wherein quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method of converting a pathology image into a feature vector programmed in a memory of a device comprising:
   a. generating a neural network, wherein the neural network includes a reconstructive aspect and an analytic aspect, the reconstructive aspect used for learning and the analytic aspect used for image analysis, wherein the reconstructive aspect is dropped after neural network learning is complete, wherein the neural network comprises a group of non-linear filters that transforms every local image region into a response vector, further wherein the neural network comprises an auto-encoder;
   b. teaching the neural network using a database of training patches cropped from a collection of pathology images at random locations of the pathology images, wherein the training patches are cropped to a certain size;
   c. mapping the training patches to response vectors;
   d. learning a mixture model from the response vectors; and
   e. applying the learned model to a pathology image to convert the pathology image into a feature vector.

2. The method of claim 1 wherein an input to the neural network comprises a patch of the image.

3. The method of claim 1 wherein a plurality of local patches of the image are input to the neural network.

4. The method of claim 1 wherein the neural network is used to extract a low dimensional representation of a set of data.

5. The method of claim 1 wherein the neural network comprises a symmetric architecture, wherein input and output have a same number of dimensions.

6. The method of claim 1 wherein the teaching is unsupervised.

7. The method of claim 6 wherein the unsupervised teaching comprises using image samples that do not have manual labels assigned by a human.

8. The method of claim 1 wherein image patches with a matching size to input of the neural network are cropped from training images.

9. The method of claim 1 wherein teaching the neural network utilizes a back-propagation algorithm or a proper learning algorithm for a specific type of network.

10. The method of claim 1 wherein the neural network comprises a two-layer network with linear or non-linear activation functions.

11. The method of claim 1 wherein learning the mixture model comprises K-means or EM algorithm.

12. The method of claim 1 further comprising applying trained neural network to a local image patch at each pixel location.

13. The method of claim 12 wherein applying the learned model to the pathology image includes: computing pathology image response vectors at every pixel location of the pathology image by densely scanning the pathology image and quantizing the response vectors against the learned model.

14. The method of claim 13 wherein quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

15. A method of analyzing an image programmed in a memory of a device comprising:
   a. generating a neural network, wherein the neural network includes a reconstructive aspect and an analytic aspect, the reconstructive aspect used for learning and the analytic aspect used for image analysis, wherein the reconstructive aspect is dropped after neural network learning is complete, wherein the neural network comprises a group of non-linear filters that transforms every local image region into a response vector, further wherein the neural network comprises an auto-encoder;
   b. teaching the neural network using unlabeled samples in a database of training patches cropped from a collection of pathology images at random locations of the pathology images, wherein the training patches are cropped to a certain size;
   c. mapping the training patches to response vectors;
   d. learning a mixture model from the response vectors; and
   e. applying the learned model to a pathology image to convert the pathology image into a feature vector.

16. The method of claim 15 wherein an input to the neural network comprises a patch of the image.

17. The method of claim 15 wherein a plurality of local patches of the image are input to the neural network.

18. The method of claim 15 wherein the neural network is used to extract a low dimensional representation of a set of data.

19. The method of claim 15 wherein the neural network comprises a symmetric architecture, wherein input and output have a same number of dimensions.

20. The method of claim 15 wherein image patches with a matching size to input of the neural network are cropped from the training images.

21. The method of claim 15 wherein teaching the neural network utilizes a back-propagation algorithm or a proper learning algorithm for a specific type of network.

22. The method of claim 15 wherein the neural network comprises a two-layer network with linear or non-linear activation functions.

23. The method of claim 15 wherein learning the mixture model comprises K-means or EM algorithm.

24. The method of claim 15 wherein applying the learned model to the pathology image includes: computing pathology image response vectors at every pixel location of the pathology image by densely scanning the pathology image and quantizing the response vectors against the learned model.

25. The method of claim 24 wherein quantizing comprises: mapping the pathology image to a quantization map array where every element stores a cluster index assigned to each pixel location; from the quantization map, computing feature vectors through statistical analysis; and concatenating the feature vectors to constitute a final quantitative description of the pathology image.

26. An apparatus comprising:
   a. a non-transitory memory for storing an application, the application for:
      i. generating a neural network comprising a symmetric architecture, wherein input and output of the neural network have a same number of dimensions, wherein the neural network includes a reconstructive aspect and an analytic aspect, the reconstructive aspect used for learning and the analytic aspect used for image analysis, wherein the reconstructive aspect is dropped after neural network learning is complete, wherein the neural network comprises a group of non-linear filters that transforms every local image region into a response vector, further wherein the neural network comprises an auto-encoder;
      ii. teaching the neural network using image samples that do not have any manual labels assigned by a human in a database of training patches cropped from a collection of pathology images at random locations of the pathology images, wherein the training patches are cropped to a certain size;
      iii. mapping the training patches to response vectors;
      iv. learning a mixture model from the response vectors; and
      v. applying the learned model to a pathology image to convert the pathology image into a feature vector, wherein applying the learned model to the pathology image includes: computing pathology image response vectors at every pixel location of the pathology image by densely scanning the pathology image and quantizing the response vectors against the learned model, wherein quantizing comprises: mapping the pathology image to a quantization map array where every element stores a cluster index assigned to each pixel location; from the quantization map, computing feature vectors through statistical analysis using a co-occurrence matrix from which Markov Stationary Features are derived; and concatenating the feature vectors to constitute a final quantitative description of the pathology image; and b. a processor coupled to the memory, the processor configured for processing the application.

27. The apparatus of claim 26 wherein the neural network is used to extract a low dimensional representation of a set of data.

28. The apparatus of claim 26 wherein image patches with a matching size to input of the neural network are cropped from the training images.

29. The apparatus of claim 26 wherein teaching the neural network utilizes a back-propagation algorithm or a proper learning algorithm for a specific type of network.

30. The apparatus of claim 26 wherein the neural network comprises a two-layer network with linear or non-linear activation functions.

31. The apparatus of claim 26 wherein learning the mixture model comprises K-means or EM algorithm.

* * * * *